United States Patent

Maeda et al.

(10) Patent No.: US 9,487,433 B2
(45) Date of Patent: Nov. 8, 2016

(54) SEALING GLASS COMPOSITION

(71) Applicant: NIHON YAMAMURA GLASS CO., LTD., Amagasaki-shi (JP)

(72) Inventors: Kozo Maeda, Amagasaki (JP); Yoshitaka Mayumi, Amagasaki (JP); Naoya Ogura, Amagasaki (JP)

(73) Assignee: NIHON YAMAMURA GLASS CO., LTD., Amagasaki-Shi (JP)

( * ) Notice: Subject to any disclaimer, the term of this patent is extended or adjusted under 35 U.S.C. 154(b) by 0 days.

(21) Appl. No.: 14/655,559

(22) PCT Filed: Dec. 23, 2013

(86) PCT No.: PCT/JP2013/084389
§ 371 (c)(1),
(2) Date: Jun. 25, 2015

(87) PCT Pub. No.: WO2014/103973
PCT Pub. Date: Jul. 3, 2014

(65) Prior Publication Data
US 2015/0360994 A1 Dec. 17, 2015

(30) Foreign Application Priority Data

Dec. 25, 2012 (JP) ................. 2012-280842

(51) Int. Cl.
*C03C 8/04* (2006.01)
*C03C 8/24* (2006.01)
*C03C 3/087* (2006.01)
*H01M 8/02* (2016.01)
*C03C 3/095* (2006.01)
*C03C 10/00* (2006.01)
*C03C 3/062* (2006.01)
*H01M 8/12* (2016.01)

(52) U.S. Cl.
CPC .............. *C03C 3/087* (2013.01); *C03C 3/062* (2013.01); *C03C 3/095* (2013.01); *C03C 8/04* (2013.01); *C03C 8/24* (2013.01); *C03C 10/0045* (2013.01); *H01M 8/0282* (2013.01); *H01M 8/1246* (2013.01); *H01M 2008/1293* (2013.01); *Y02E 60/50* (2013.01); *Y02E 60/525* (2013.01)

(58) Field of Classification Search
CPC .................................. C04B 8/04; C04B 8/24
See application file for complete search history.

(56) References Cited

U.S. PATENT DOCUMENTS 4,959,330 A 9/1990 Donohue et al.
5,210,057 A 5/1993 Haun et al.

FOREIGN PATENT DOCUMENTS

| JP | 62113725 | * | 5/1987 |
|----|----------|---|--------|
| JP | 3-197333 | | 8/1991 |
| JP | 03197333 | * | 8/1991 |
| JP | 5-97471 | | 4/1993 |
| JP | 5-97472 | | 4/1993 |
| JP | 2006-056769 | | 3/2006 |
| JP | 2009-533310 | | 9/2009 |
| JP | 2009-533311 | | 9/2009 |
| JP | 2011-522361 | | 7/2011 |
| JP | 2012-162445 | | 8/2012 |
| JP | 2012-519149 | | 8/2013 |
| JP | 2013-241323 | | 12/2013 |

OTHER PUBLICATIONS

International Search Report of PCT/JP2013/084389, dated Mar. 25, 2014, 4 pages total.

* cited by examiner

*Primary Examiner* — Karl Group
(74) *Attorney, Agent, or Firm* — Hamre, Schumann, Mueller & Larson, P.C.

(57) ABSTRACT

Disclosed is a high-strength, high-expansion crystallized glass composition that, by being fired at not less than 850° C., can be used at high temperatures at not less than 950° C. The composition is a sealing glass composition substantially free of boron oxide and comprising the following components, in mol %, $SiO_2$: 40-50%, ZnO: 16-30%, BaO: 5-25%, CaO: 0-25%, $Al_2O_3$: 0-5%, and RO: not less than 44% (wherein R denotes one or more species of Mg, Ca, Sr, Ba, and Zn).

7 Claims, No Drawings

SEALING GLASS COMPOSITION

TECHNICAL FIELD

The present invention relates to a glass composition used for provide a seal between metal and ceramics, and more specifically to a sealing glass composition used as a sealant for sealing the joints between each cell of solid oxide fuel cells (SOFC) and metal parts for assembling them, as well as the joints between metal parts, or as a sealant for providing a seal to an exhaust gas sensor and the like.

BACKGROUND ART

While there are needs for a sealant for solid oxide fuel cells (SOFC), it is prerequisite that such a sealant would neither degrade nor melt even after exposure to high temperatures for a long time, for it comes to be exposed to such high temperatures as 600-800° C. for an extended length of time. Crystallized glass hase thus been proposed. Also required is flowability of the glass during firing in order for providing a seal between metal and ceramics.

On the other hand, many of the crystallized glass compositions for sealing SOFC that have been developed so far include $B_2O_3$ and alkali metal oxides (Patent Documents 1 and 2). However, there has emerged a problem of contamination of electrodes with evaporating glass components such as $B_2O_3$ while such a sealant is kept at high temperatures, and therefore, it is desired to develop a glass composition free of evaporating components, in particular, $B_2O_3$.

Though some glass compositions free of $B_2O_3$ have been developed (Patent Documents 3 and 4), they have a drawback that they have insufficient flowability because of their small ZnO content. While there is an example of glass composition that has been developed free of $B_2O_3$ and alkali metal oxides (Patent Document 5), that glass compound contains not more than 43 mol % alkaline earth oxides RO (R: Mg, Ca, Sr, Ba, Zn) as glass-modifying oxides, and consequently, includes a large content of a glass-forming oxide ($SiO_2$), which results in an insufficient crystallization during firing, and further has drawback of poor flowability because of its small ZnO content. Further, while a $SiO_2$—MgO-based glass composition has been disclosed (Patent Document 6), the composition, which is free of $B_2O_3$, has also a drawback of poor flowability coming from its low ZnO content.

PRIOR ART DOCUMENTS

Patent Documents

[Patent Document 1] JP2012-519149
[Patent Document 2] JP2006-056769
[Patent Document 3] JP2009-533310
[Patent Document 4] JP2009-533311
[Patent Document 5] JP2011-522361
[Patent Document 6] JP2012-162445

DISCLOSURE OF INVENTION

Problem to be Solved by the Invention

Against the above-mentioned background, it is an objective of the present invention to provide a crystallized glass composition that, by being fired at not less than 850° C., has such high strength and high thermal expansion as allow itself to be used at high temperatures of not less than 950° C., and yet contains no $B_2O_3$.

Means to Solve the Problems

The present inventors, as a result of studies to solve the above-mentioned problem, found that a $SiO_2$—ZnO—BaO—CaO—$Al_2O_3$-based glass composition, if it falls within a certain range of components, will give, through firing at 850-1050° C. the glass powder consisting of the glass composition, a high-strength glass-ceramic material having a coefficient of thermal expansion of $80\text{-}130 \times 10^{-7}$ (50-850° C.), which is compatible with metal and ceramics, and has high linearity of its curve of thermal expansion. The present invention has been completed through intense studies based on these findings. Thus, the present invention provides what follows.

1. A sealing glass composition substantially free of boron oxide and comprising the following components, in mol %,

| | |
|---|---|
| $SiO_2$ | 40-50% |
| ZnO | 16-30% |
| BaO | 5-25% |
| CaO | 0-25% |
| $Al_2O_3$ | 0-5%, and |
| RO | not less than 44% |

(wherein R denotes one or more species of Mg, Ca, Sr, Ba, and Zn).

2. The sealing glass composition according to 1 above substantially free of boron oxide and comprising the following components, in mol %,

| | |
|---|---|
| $SiO_2$ | 45-50% |
| ZnO | 16-26% |
| BaO | 8-20% |
| CaO | 5-22% |
| $Al_2O_3$ | 0-3%, and |
| RO | not less than 44% |

(wherein R denotes one or more species of Mg, Ca, Sr, Ba, and Zn).

3. The sealing glass composition according to 2 above substantially free of boron oxide and comprising the following components, in mol %,

| | |
|---|---|
| $SiO_2$ | 45-50% |
| ZnO | 16-26% |
| BaO | 8-16% |
| CaO | 10-22% |
| $Al_2O_3$ | 0-2%, and |
| RO | not less than 44% |

(wherein R denotes one or more species of Mg, Ca, Sr, Ba, and Zn).

4. The sealing glass composition according to one of 1-3 above further comprising, in mol %, less than 5% MgO or not more than 5% SrO.

5. The sealing glass composition according to one of 1-4 above further comprising, in mol %, not more than 4% $La_2O_3$.

6. The sealing glass composition according to one of 1-5 above further comprising, in mol %, not more than 6% $TiO_2$, not more than 5% $ZrO_2$, or not more than 2% $Nb_2O_5$.

7. The sealing glass composition according to one of 1-6 above further comprising, in mol %, $CeO_2$ or $Yb_2O_3$ at not more than 2%.

Effect of the Invention

The present invention as described above enables one to obtain powder of a glass composition that will, when fired, crystallize and give high-strength, high-expansion crystallized glass substantially free of $B_2O_3$. Therefore, the glass composition according to the present invention can be used, in the form of powder, as a sealant at positions where a seal is required between metal and ceramics, metal and metal, as well as ceramics and ceramics, which are used at high temperatures (e.g., sealing positions of solid oxide fuel cells or an exhaust gas sensor). A seal provided at such sealing positions using the glass composition according to the present invention will neither lose its electrical insulation even exposed to high temperature conditions of 700-1000° C. for an extended length of time, nor exhibit lowering viscosity of the sealant at such high temperatures. Thus, the glass composition according to the present invention can be suitably used as a sealant that provides high insulation and durability.

MODE FOR CARRYING OUT THE INVENTION

A first characteristic of the sealing glass composition according to the present invention is that it is substantially free of boron oxide, and comprises as components, in mol %, $SiO_2$: 40-50%, ZnO: 16-30%, BaO: 5-25%, CaO: 0-25%, $Al_2O_3$: 0-5%, and RO (R denotes one or more species selected from Mg, Ca, Sr, Ba, and Zn) not less than 44%, and that the crystallized glass formed by firing the powder of the glass composition at 850-1050° C. exhibits the coefficient of thermal expansion of $80-130 \times 10^{-7}$/° C. at 50-850° C.

Further, the sealing glass composition according to the present invention has as its second characteristic that, within the scope of the first characteristic mentioned above, it comprises as components, in mol %, in particular, $SiO_2$: 45-50%, ZnO: 16-26%, BaO: 8-20%, CaO: 5-22%, $Al_2O_3$: 0-3%, and RO (R denotes one or more species selected from Mg, Ca, Sr, Ba, and Zn): not less than 44%, and that the crystallized glass formed by firing the powder of the glass composition at 850-1050° C. exhibits the coefficient of thermal expansion of $80-130 \times 10^{-7}$/° C. at 50-850° C.

Furthermore, a third characteristic of the sealing the glass composition according to the present invention has as its third characteristic that, within the second characteristic as mentioned above, it comprises as components, in mol %, in particular, $SiO_2$: 45-50%, ZnO: 16-26%, BaO: 8-16%, CaO: 10-22%, $Al_2O_3$: 0-2%, and RO (R denotes one or more species selected from Mg, Ca, Sr, Ba, and Zn): not less than 44%, and that that the crystallized glass formed by firing the powder of the glass composition at 850-1050° C. exhibits the coefficient of thermal expansion of $80-130 \times 10^{-7}$/° C. at 50-850° C.

Still further, the sealing glass composition according to the present invention has as its fourth characteristic that, in addition to one of the first to the third characteristics mentioned above, it comprises as components, in mol %, in particular, less than 5% MgO or not more than 5% SrO.

Still further, the sealing glass composition according to the present invention has as its fifth characteristic that it, in addition to one of the first to the forth characteristics mentioned above, further comprises as a component, in mol %, in particular, not more than 4% $La_2O_3$.

Still further, the sealing glass composition according to the present invention has as its sixth characteristic that, in addition to one of the first to the fifth characteristics mentioned above, it further comprises as components, in mol %, in particular, not more than 6% $TiO_2$, not more than 5% $ZrO_2$, or not more than 2% $Nb_2O_5$.

Still further, the sealing glass composition according to the present invention has as its seventh characteristic that, in addition to one of the first to the sixth characteristics mentioned above, it further comprises as components, in mol %, in particular $CeO_2$ or $Yb_2O_3$, at not more than 2%.

Still further, the sealing glass composition according to the present invention has as its eighth characteristic that, in addition to one of the first to the seventh characteristics mentioned above, it has a mean particle size of 2-10 μm.

In the composition of the present invention, $SiO_2$ is a glass network former component. When the content of $SiO_2$ is less than 40 mol %, there is a possibility that no glass will is formed, or that even if glass is formed, it may prove to be poorly formed glass. Besides, when the content of $SiO_2$ exceeds 50 mol %, there arises a possibility that the softening point will increase, thereby making sealing impossible at lower temperatures. Considering such factors as flowability and softening point of the glass, the content of $SiO_2$ is preferably 40-50 mol %, and more preferably 45-50 mol %.

ZnO is a component which is effective in lowering of the softening point and increasing flowability. When its content is less than 16 mol %, ZnO is not effective to increase flowability. Further, when the content of ZnO exceeds 30 mol %, though glass can be obtained in some cases, the coefficient of thermal expansion after crystallization may prove to be insufficient. Considering the flowability and softening point, as well as the coefficient of thermal expansion after crystallization, the content of ZnO is preferably 16-30 mol %, and more preferably 16-26 mol %.

BaO is a component which lowers the softening point and increases the coefficient of thermal expansion, and it is also a component which improves glass forming ability. When the content of BaO is less than 5 mol %, though glass can be obtained, there is a possibility that the softening point will be too high or the coefficient of thermal expansion will stay insufficient. Further, when the content of BaO exceeds 25 mol %, though glass can be obtained in some cases, crystallization temperature may become too low. Considering the softening point and coefficient of thermal expansion, the content of BaO is preferably 5-25 mol %, and more preferably 8-20 mol %, and still more preferably 8-16 mol %.

CaO is a component that improves glass forming ability. Though its inclusion is optional, CaO is preferably contained at 5-22 mol %. When the content of CaO exceeds 22 mol %, there is a possibility that the crystallization rate will stay insufficient after firing. Considering glass forming ability, and the crystallization rate of the glass after firing, the content of CaO is more preferably 10-22 mol %.

$Al_2O_3$ is a component with which the crystallization starting temperature can be adjusted to improve glass forming ability. Though its inclusion is optional, $Al_2O_3$ is preferably contained in the range of not more than 5 mol %. When contained at more than 5 mol %, it might partly remain unmelted. Considering such factors as glass forming ability, the content of $Al_2O_3$ is more preferably 0-3 mol %, and still more preferably 0-2 mol %.

MgO is a component that improves glass forming ability. It is undesirable for the content of MgO to exceed 9 mol %, for it would lead to failure of glass formation or lowered crystallization temperature. To further guarantee stable production of the glass and suitable crystallization temperature, the content of MgO, when it is contained, is preferably less than 5 mol %.

SrO is a component that improves glass forming ability, and may be contained up to 5 mol %. It is undesirable for the content of SrO to exceed 5 mol %, for it would prevent glass formation or lead to lowered crystallization temperature.

RO (R represent Mg, Ca, Sr, Ba, and Zn comprehensively) may be contained at not less than 44 mol %. When the content of RO is less than 44 mol %, the content of the glass forming oxide ($SiO_2$) increases as a result, which then may lead to insufficient crystallization during firing.

$La_2O_3$ is a component that serves to keep the strength of adhesion to metal surfaces, and also a component with which the crystallization starting temperature can be adjusted. $La_2O_3$ may be contained up to 4 mol %. It is undesirable for the content of $La_2O_3$ to exceed 4 mol %, for it would raise the crystallization starting temperature and resulting in too much glassy components left behind.

$TiO_2$ is a component that accelerates crystal formation and improves weather resistance of the glass, and it may be contained at not more than 6 mol %. It is undesirable for the content of $TiO_2$ to exceed 6 mol %, for it then may partly remain unmelted in the melt.

$ZrO_2$ is a component that accelerates crystal formation and improves weather water resistance of the glass, and it may be contained not more than 5 mol %. It is undesirable for the content of $ZrO_2$ to exceed 5 mol %, for it would prevent glass formation or cause $ZrO_2$ to partly remain unmelted.

$Nb_2O_5$ is a component that improves water resistance of the glass and may be contained not more than 2 mol %. It is undesirable for the content of $Nb_2O_5$ to exceed 2 mol %, for it might prevent glass formation.

For the purpose of improving the stability during production of the glass, suppressing reactions with metals, improving adhesiveness between metal and the glass sealant, and adjusting the species and proportions of precipitating crystals, one or more oxides may be added, at not more than 2 mol % in total, which are selected from the group consisting of $Fe_2O_3$, CuO, CoO, NiO, and $Ln_2O_3$ (lanthanoid oxides other than $La_2O_3$, such as $CeO_2$, $Yb_2O_3$ and the like) in addition to the aforementioned components.

Whereas the aforementioned components may be contained in the sealing glass composition of the present invention, it is preferred that $B_2O_3$ is substantially not contained, because it is a component that might evaporate to contaminate electrodes while being kept at high temperatures, though it serves to stabilize the glass state in the process of glass production. Further, it is also preferable that alkali metals such as Na and K are substantially not contained, for their reaction with metals tend to be accelerated in a high-temperature range. The term "substantially not contained" herein is not intended to prohibit containing them at contaminant levels, but containing them at such levels are permitted that are seen when they are present merely as contaminants in the raw materials employed in glass production. More specifically, the term "substantially not contained" is met when the total amount of such components are not more than 1000 ppm calculated as their oxides, for such inclusion in the sealing glass composition of the present invention would be least likely to cause a problem.

Powder consisting of the sealing glass composition according to the present invention and a sealant containing the powder will be described below.

The powder consisting of the sealing glass composition according to the present invention may be produced by, e.g., combining and mixing metal oxides used as raw materials, melting the mixture at, e.g., 1450-1500° C., then cooling the glass melt while preventing crystallization from taking place, and dry grinding the cooled glass.

When fired, glass powder consisting of the sealing glass composition according to the present invention must once shrink and while softening and flowing, wet the surfaces of metal and ceramics. Therefore, high flowability during firing is required. For this, it is preferred to adjust the particle size based on grinding conditions so that the mean particle size comes to 2-10 µm, and the maximum particle size not more than 150 µm. Besides, in the present specification, the term "mean particle size" is volume-based (in which the total volume of the particles falling within each "particle size interval" of the particle-size distribution, is recorded as "frequency").

Here, fine powder consisting of particles of too small sizes is not preferable, because its crystallization will start too early, which then will reduce the composition's flowability indispensable in firing of the sealant and hinder its flow and make it necessary to add to cycles of repeated application and firing of the sealant, leading to increased cost of production. On the other hand, coarse powder consisting of particles of too large sizes will cause problems that the powder particles readily settle and separate when the powder is made into a paste or while it is applied and dried, and that uneven and insufficient crystallization will likely take place, resulting in lowered strength. Such fine or coarse powder components can be removed by means of classification or the like to adjust particle sizes. The mean particle size is preferably no less than 2 µm and not more than 10 µm, more preferably not less than 4 µm and not more than 8 µm. Further, the maximum particle size is preferably not more than 150 µm, and more preferably not more than 100 µm. Therefore, a combination of the mean particle size of 8 µm with the maximum particle size of not more than 150 µm, or the mean particle size of 4 µm with the maximum particle size of not more than 100 µm, or the like, is allowable.

The sealing glass composition of the present invention may be used to provide a seal between ceramics and metal, either in the form of glass powder or as its mixture with ceramic powder. In sealing, it is possible to apply it to the object by such means as printing, and fire it at 850-1050° C. Further, it may be mixed with a molding aid, dry pressed and calcined at a temperature near the softening point of the glass to form a compact, which then may be combined with the above paste.

Further, in order for fine adjustment of thermal expansion, as well as to accelerate crystallization of the glass for improved strength, ceramic fillers (ceramic powder) may be added to the glass powder up to levels at which no decrease of the flowability of the composition is induced during firing. When its amount added is less than 0.01 wt % relative to the amount of the glass powder, no effect will be observed, and when more than 20 wt %, the flowability of the composition will be reduced and thus the flow of the composition will be hindered during firing, both of which are undesirable. Therefore, the amount is preferably 0.01-20 wt %, more preferably 0.03-10 wt %, and still more preferably 0.1-5 wt %.

As ceramic fillers, alumina, zirconia preferably partially stabilized zirconia, magnesia, forsterite, steatite, and wollastonite are named. Their mean particle size is preferably not more than 20 µm, more preferably not more than 5 µm, still more preferably not more than 3 µm, and their maximum size is not more than 106 μm, more preferably not more than 45 μm, and still more preferably not more than 22 μm.

Sealants comprising the sealing glass composition according to the present invention may be not only in the form of the above glass powder (or a mixture powder with ceramic fillers) but also either in the form of a paste prepared by dispersing the powder in a binder or of a slurry prepared by dispersing it in a solvent. Because of the coefficient of thermal expansion of their fired bodies obtained after firing, sealants comprising the above-mentioned glass composition, in particular, are suitable for use to seal ceramic parts and the like. Namely, that the coefficient of thermal expansion of the crystallized glass resulting after firing the sealant falls within the range of 80-130×$10^{-7}$/° C. at 50-850° C. is particularly suitable for use to seal ceramic parts and the like having a comparable coefficient of thermal expansion.

EXAMPLE

While the present invention will be described in further detain with reference to typical examples, it is not intended that the present invention be limited to the examples.

Examples and Comparative Examples

Preparation of Glass and Glass Powder

Raw materials were combined and mixed so as to give respective glass compositions as shown in Tables 1-6, 8-10, and the mixtures of raw materials were put in respective crucibles and melted for 2 hours at 1400-1500° C., and were formed into glass flakes. The glass flakes then were put into pot mills and ground so that the mean particular size (volume-based) of 3-10 μm was reached. Then coarse particles were removed using a sieve of 106 μm openings to obtain the glass powders of Examples 1-49 and Comparative Examples 1-2. Further, the glass powder of Example 30 and a filler (forsterite) were mixed as shown in Table 7 to provide the mixture powder of Example 41.

[Test Method]

The glass powders and the mixture powder of Examples and Comparative Examples were respectively measured for their softening point, peak crystallization temperature, and mean particle size, and then fired and measured for the flow diameter and coefficient of thermal expansion of the respective pressed powder compacts for evaluation.

(1) Softening Point, and Peak Crystallization Temperature

About 40 mg of each powder mentioned above were put in a platinum crucible, and the softening point (Ts) and the peak crystallization temperature (Tp) of the powder were measured using a DTA analyzer (Thermo Plus TG8120, RIGAKU), while raising the temperature at the rate of 20° C./min starting from room temperature.

(2) Mean Particle Size of the Glass Powder

Each of the above powder was measured for its $D_{50}$ in the volume distribution mode, using a laser diffraction particle size distribution analyzer.

(3) Flow Diameter of the Pressed Powder Compact

Each of the above powders was put in a mold (20-mm I.D.) and pressed under 20 MPa for 5-10 seconds to form a compact, which then was placed on an alumina plate, and its temperature was raised at the rate of 200° C./h up to 900° C., and kept at 900° C. for one hour for firing. The diameter of the fired body was measured as the flow diameter.

(4) Coefficient of Thermal Expansion

The fired bodies obtained in (3) above were cut to the size of about 5×5×15 mm to prepare test pieces. For each test piece, its coefficient of thermal expansion (a) was determined based on the two points of 50° C. and 850° C. on the thermal expansion curve that was produced using a TMA analyzer by raising the temperature at the rate of 10° C./min from room temperature.

The composition of the powder and the test results of each of the above Examples and Comparative Examples are summarized in Tables 1-10 below. In the tables, the measurements in the lines of "Coefficient of thermal expansion" are presented in the unit "×$10^{-7}$". As seen in the tables, all the powders of Examples exhibited a good mutual balance between the properties measured. On the other hand, with regard to the powders of Comparative Examples, whose compositions fall outside the scope of the glass composition of the present invention, Comparative Example 1 had a problem that its flow diameter in insufficient, and Comparative Example 2 had a problem that it does not crystallize by firing.

TABLE 1

| Glass Name | Example 1 | | Example 2 | | Example 3 | | Example 4 | | Example 5 | |
|---|---|---|---|---|---|---|---|---|---|---|
| Composition | mol % | wt % | mol % | wt % | mol % | wt % | mol % | wt % | mol % | wt % |
| $SiO_2$ | 40.00 | 29.75 | 45.00 | 30.37 | 47.00 | 35.55 | 50.00 | 36.13 | 47.00 | 38.07 |
| ZnO | 30.00 | 30.23 | 27.50 | 25.14 | 22.00 | 22.54 | 26.00 | 25.45 | 20.00 | 21.94 |
| BaO | 15.00 | 28.48 | 22.50 | 38.76 | 14.00 | 27.03 | 19.00 | 35.05 | 11.00 | 22.74 |
| CaO | 13.00 | 9.02 | | | 12.00 | 8.47 | 5.00 | 3.37 | 21.00 | 15.88 |
| $Al_2O_3$ | 2.00 | 2.52 | 5.00 | 5.73 | 5.00 | 6.42 | | | 1.00 | 1.37 |
| MgO | | | | | | | | | | |
| $La_2O_3$ | | | | | | | | | | |
| $TiO_2$ | | | | | | | | | | |
| $ZrO_2$ | | | | | | | | | | |
| $Nb_2O_5$ | | | | | | | | | | |
| SrO | | | | | | | | | | |
| Total | 100 | 100 | 100 | 100 | 100 | 100 | 100 | 100 | 100 | 100 |
| Softening point/° C. | 724 | | 749 | | 747 | | 739 | | 727 | |
| Peak crystallization temperature/° C. | 833 | | 840 | | 911 | | 852 | | 903 | |
| Coefficient of thermal expansion (50-850° C.) | 116 | | 104 | | 95 | | 96 | | 114 | |
| Flow diameter | 16.8 | | 16.8 | | 16.9 | | 16.8 | | 17.2 | |
| Mean particle size $D_{50}$ | 3.8 | | 3.6 | | 3.6 | | 3.5 | | 3.6 | |

TABLE 2

| Glass Name | Example 6 | | Example 7 | | Example 8 | | Example 9 | | Example 10 | |
|---|---|---|---|---|---|---|---|---|---|---|
| Composition | mol % | wt % | mol % | wt % | mol % | wt % | mol % | wt % | mol % | wt % |
| $SiO_2$ | 47.00 | 41.01 | 47.00 | 37.32 | 47.00 | 36.85 | 47.00 | 36.17 | 47.00 | 37.07 |
| ZnO | 22.00 | 26.01 | 22.00 | 23.67 | 22.00 | 23.37 | 22.00 | 22.94 | 24.00 | 25.65 |
| BaO | 5.00 | 11.14 | 12.00 | 24.32 | 13.00 | 26.02 | 14.00 | 27.50 | 12.00 | 24.16 |
| CaO | 25.00 | 20.36 | 18.00 | 13.34 | 17.00 | 12.44 | 15.00 | 10.78 | 16.00 | 11.78 |
| $Al_2O_3$ | 1.00 | 1.48 | 1.00 | 1.35 | 1.00 | 1.33 | 2.00 | 2.61 | 1.00 | 1.34 |
| MgO | | | | | | | | | | |
| $La_2O_3$ | | | | | | | | | | |
| $TiO_2$ | | | | | | | | | | |
| $ZrO_2$ | | | | | | | | | | |
| $Nb_2O_5$ | | | | | | | | | | |
| SrO | | | | | | | | | | |
| Total | 100 | 100 | 100 | 100 | 100 | 100 | 100 | 100 | 100 | 100 |
| Softening point/° C. | 742 | | 740 | | 753 | | 742 | | 724 | |
| Peak crystallization temperature/° C. | 905 | | 885 | | 877 | | 878 | | 867 | |
| Coefficient of thermal expansion (50-850° C.) | 81 | | 91 | | 108 | | 107 | | 105 | |
| Flow diameter | 17.2 | | 17.1 | | 16.8 | | 16.9 | | 17.0 | |
| Mean particle size $D_{50}$ | 4.3 | | 4.2 | | 4.6 | | 5.9 | | 4.3 | |

TABLE 3

| Glass Name | Example 18 | | Example 19 | | Example 20 | | Example 21 | | Example 23 | |
|---|---|---|---|---|---|---|---|---|---|---|
| Composition | mol % | wt % | mol % | wt % | mol % | wt % | mol % | wt % | mol % | wt % |
| $SiO_2$ | 47.00 | 38.99 | 47.00 | 37.00 | 47.00 | 36.08 | 47.00 | 37.71 | 47.00 | 36.52 |
| ZnO | 22.00 | 24.72 | 22.00 | 23.46 | 22.00 | 22.88 | 24.00 | 26.09 | 26.00 | 27.36 |
| BaO | 9.00 | 19.06 | 13.00 | 26.12 | 15.00 | 29.39 | 11.00 | 22.53 | 13.00 | 25.78 |
| CaO | 19.00 | 14.71 | 15.00 | 11.02 | 13.00 | 9.32 | 15.00 | 11.23 | 11.00 | 7.98 |
| $Al_2O_3$ | 1.00 | 1.41 | 1.00 | 1.34 | 1.00 | 1.30 | 1.00 | 1.36 | 1.00 | 1.32 |
| MgO | 2.00 | 1.11 | 2.00 | 1.06 | 2.00 | 1.03 | 2.00 | 1.08 | 2.00 | 1.04 |
| $La_2O_3$ | | | | | | | | | | |
| $TiO_2$ | | | | | | | | | | |
| $ZrO_2$ | | | | | | | | | | |
| $Nb_2O_5$ | | | | | | | | | | |
| SrO | | | | | | | | | | |
| Total | 100 | 100 | 100 | 100 | 100 | 100 | 100 | 100 | 100 | 100 |
| Softening point/° C. | 733 | | 734 | | 731 | | 729 | | 728 | |
| Peak crystallization temperature/° C. | 891 | | 870 | | 858 | | 864 | | 848 | |
| Coefficient of thermal expansion (50-850° C.) | 99 | | 114 | | 116 | | 102 | | 107 | |
| Flow diameter | 16.8 | | 16.8 | | 16.8 | | 16.8 | | 16.8 | |
| Mean particle size $D_{50}$ | 4.3 | | 4.1 | | 5.0 | | 4.0 | | 3.7 | |

TABLE 4

| Glass Name | Example 24 | | Example 25 | | Example 26 | | Example 27 | | Example 28 | |
|---|---|---|---|---|---|---|---|---|---|---|
| Composition | mol % | wt % | mol % | wt % | mol % | wt % | mol % | wt % | mol % | wt % |
| $SiO_2$ | 49.00 | 37.82 | 45.00 | 33.81 | 47.00 | 33.25 | 47.00 | 35.10 | 47.00 | 35.50 |
| ZnO | 20.00 | 20.91 | 18.00 | 18.32 | 16.00 | 15.33 | 16.00 | 16.19 | 16.00 | 16.37 |
| BaO | 15.00 | 29.55 | 12.00 | 23.01 | 12.00 | 21.67 | 12.00 | 22.87 | 12.00 | 23.14 |
| CaO | 13.00 | 9.37 | 22.00 | 15.43 | 20.00 | 13.21 | 20.00 | 13.94 | 22.00 | 15.51 |
| $Al_2O_3$ | 1.00 | 1.31 | 1.00 | 1.28 | 1.00 | 1.20 | 3.00 | 3.80 | 1.00 | 1.28 |
| MgO | 2.00 | 1.04 | | | | | | | | |
| $La_2O_3$ | | | 2.00 | 8.15 | 4.00 | 15.34 | 2.00 | 8.10 | 2.00 | 8.19 |
| $TiO_2$ | | | | | | | | | | |
| $ZrO_2$ | | | | | | | | | | |
| $Nb_2O_5$ | | | | | | | | | | |
| SrO | | | | | | | | | | |
| Total | 100 | 100 | 100 | 100 | 100 | 100 | 100 | 100 | 100 | 100 |
| Softening point/° C. | 735 | | 748 | | 766 | | 758 | | 769 | |
| Peak crystallization temperature/° C. | 877 | | 972 | | 974 | | 1039 | | 999 | |

TABLE 4-continued

| Glass Name | Example 24 | | Example 25 | | Example 26 | | Example 27 | | Example 28 | |
|---|---|---|---|---|---|---|---|---|---|---|
| Composition | mol % | wt % | mol % | wt % | mol % | wt % | mol % | wt % | mol % | wt % |
| Coefficient of thermal expansion (50-850° C.) | 100 | | 105 | | 112 | | 105 | | 111 | |
| Flow diameter | 16.8 | | 17.9 | | 17.5 | | 18.2 | | 18.0 | |
| Mean particle size $D_{50}$ | 5.5 | | 4.5 | | 4.3 | | 3.9 | | 5.0 | |

TABLE 5

| Glass Name | Example 29 | | Example 30 | | Example 31 | | Example 32 | | Example 33 | |
|---|---|---|---|---|---|---|---|---|---|---|
| Composition | mol % | wt % | mol % | wt % | mol % | wt % | mol % | wt % | mol % | wt % |
| $SiO_2$ | 47.00 | 35.71 | 47.00 | 35.28 | 47.00 | 36.39 | 47.00 | 34.64 | 47.00 | 34.77 |
| ZnO | 16.00 | 16.47 | 18.00 | 18.30 | 19.00 | 19.93 | 20.00 | 19.97 | 20.00 | 20.05 |
| BaO | 12.00 | 23.27 | 12.00 | 22.99 | 12.00 | 23.72 | 13.00 | 24.46 | 13.00 | 24.55 |
| CaO | 23.00 | 16.31 | 20.00 | 14.01 | 20.00 | 14.45 | 17.00 | 11.69 | 15.00 | 10.36 |
| $Al_2O_3$ | | | 1.00 | 1.27 | 1.00 | 1.31 | 1.00 | 1.25 | 1.00 | 1.26 |
| MgO | | | | | | | | | 2.00 | 0.99 |
| $La_2O_3$ | 2.00 | 8.24 | 2.00 | 8.14 | 1.00 | 4.20 | 2.00 | 7.99 | 2.00 | 8.02 |
| $TiO_2$ | | | | | | | | | | |
| $ZrO_2$ | | | | | | | | | | |
| $Nb_2O_5$ | | | | | | | | | | |
| SrO | | | | | | | | | | |
| Total | 100 | 100 | 100 | 100 | 100 | 100 | 100 | 100 | 100 | 100 |
| Softening point/° C. | 753 | | 747 | | 739 | | 757 | | 757 | |
| Peak crystallization temperature/° C. | 991 | | 958 | | 932 | | 915 | | 900 | |
| Coefficient of thermal expansion (50-850° C.) | 103 | | 113 | | 92 | | 115 | | 113 | |
| Flow diameter | 17.5 | | 17.8 | | 17.2 | | 16.8 | | 17.1 | |
| Mean particle size $D_{50}$ | 4.3 | | 4.5 | | 3.5 | | 4.6 | | 4.7 | |

TABLE 6

| Glass Name | Example 34 | | Example 37 | | Example 38 | | Example 39 | |
|---|---|---|---|---|---|---|---|---|
| Composition | mol % | wt % | mol % | wt % | mol % | wt % | mol % | wt % |
| $SiO_2$ | 47.00 | 34.78 | 47.00 | 37.16 | 47.00 | 36.20 | 47.00 | 35.82 |
| ZnO | 13.00 | 13.03 | 18.00 | 19.28 | 18.00 | 18.78 | 18.00 | 18.58 |
| BaO | 13.00 | 24.56 | 12.00 | 24.22 | 12.00 | 23.59 | 14.00 | 23.34 |
| CaO | 18.00 | 12.43 | 20.00 | 14.76 | 17.00 | 12.22 | 18.00 | 14.23 |
| $Al_2O_3$ | 1.00 | 1.26 | 1.00 | 1.34 | 1.00 | 1.31 | 1.00 | 1.29 |
| MgO | | | | | | | | |
| $La_2O_3$ | 2.00 | 8.03 | | | | | | |
| $TiO_2$ | 6.00 | 5.91 | | | | | | |
| $ZrO_2$ | | | 2.00 | 3.24 | 5.00 | 7.90 | | |
| $Nb_2O_5$ | | | | | | | 2.00 | 6.74 |
| SrO | | | | | | | | |
| Total | 100 | 100 | 100 | 100 | 100 | 100 | 100 | 100 |
| Softening point/° C. | 757 | | 759 | | 767 | | 755 | |
| Peak crystallization temperature/° C. | 946 | | 1009 | | 1033 | | 966 | |
| Coefficient of thermal expansion (50-850° C.) | 105 | | 107 | | 98 | | 81 | |
| Flow diameter | 18.2 | | 17.7 | | 17.8 | | 17.8 | |
| Mean particle size $D_{50}$ | 10 | | 4.5 | | 2.9 | | 3.0 | |

TABLE 7

|  | Example 41 |
|---|---|
| Glass: Filler (wt %) | 90  10 |
| Glass | Example 30 |
| Filler | Forsterite |
| Coefficient of thermal expansion (50-850° C.) | 118 |
| Flow diameter | 17.0 |

TABLE 8

| Glass Name | Comparative Example 1 | | Comparative Example 2 | |
|---|---|---|---|---|
| Composition | mol % | wt % | mol % | wt % |
| $SiO_2$ | 40.00 | 32.16 | 56.00 | 45.52 |
| ZnO | 10.00 | 10.89 | 10.00 | 11.01 |
| BaO | 15.00 | 30.78 | 10.00 | 20.75 |
| CaO | 15.00 | 11.26 | 15.00 | 11.38 |
| $Al_2O_3$ | 5.00 | 6.82 | | |
| MgO | 15.00 | 8.09 | | |
| $La_2O_3$ | | | | |
| $TiO_2$ | | | 4.00 | 4.32 |
| $ZrO_2$ | | | | |
| $Nb_2O_5$ | | | | |
| SrO | | | 5.00 | 7.01 |
| Total | 100 | 100 | 100 | 100 |
| Softening point/° C. | 758 | | 772 | |
| Peak crystallization temperature/° C. | 875 | | Undetected | |
| Coefficient of thermal expansion (50-850° C.) | 122 | | 103 | |
| Flow diameter | 16.7 | | 18.0 | |
| Mean particle size $D_{50}$ | 5.3 | | 3.7 | |

TABLE 9

| Glass Name | Example 43 | | Example 44 | | Example 45 | | Example 46 | | Example 47 | |
|---|---|---|---|---|---|---|---|---|---|---|
| Composition | mol % | wt % | mol % | wt % | mol % | wt % | mol % | wt % | mol % | wt % |
| $SiO_2$ | 49.00 | 37.56 | 49.00 | 38.28 | 49.00 | 37.86 | 49.00 | 38.20 | 49.00 | 37.46 |
| ZnO | 16.80 | 17.44 | 17.10 | 18.10 | 19.50 | 20.41 | 16.50 | 17.43 | 17.00 | 17.60 |
| BaO | 14.00 | 27.39 | 12.80 | 25.53 | 13.00 | 25.64 | 13.00 | 25.87 | 13.00 | 25.37 |
| CaO | 10.50 | 7.51 | 12.00 | 8.75 | 8.00 | 5.77 | 11.50 | 8.37 | 12.50 | 8.92 |
| $Al_2O_3$ | 1.00 | 1.30 | 1.00 | 1.33 | 1.00 | 1.31 | 1.00 | 1.32 | 1.00 | 1.30 |
| MgO | 4.50 | 2.31 | 4.50 | 2.36 | 4.50 | 2.33 | 4.50 | 2.35 | 4.50 | 2.31 |
| $La_2O_3$ | 0.70 | 2.91 | 0.60 | 2.54 | | | | | | |
| $TiO_2$ | 3.50 | 3.57 | 3.00 | 3.11 | | | 3.00 | 3.11 | 2.00 | 2.03 |
| SrO | | | | | 5.00 | 6.66 | | | | |
| $CeO_2$ | | | | | | | 1.50 | 3.35 | | |
| $Yb_2O_3$ | | | | | | | | | 1.00 | 5.01 |
| Total | 100 | 100 | 100 | 100 | 100 | 100 | 100 | 100 | 100 | 100 |
| Softening point/° C. | 762 | | 753 | | 752 | | 754 | | 768 | |
| Peak crystallization temperature/° C. | 949 | | 959 | | 884 | | 940 | | 935 | |
| Coefficient of thermal expansion (50-850° C.) | 90 | | 90 | | 118 | | 84 | | 94 | |
| Flow diameter | 17.8 | | 18.0 | | 16.9 | | 17.4 | | 17.4 | |
| Mean particle size $D_{50}$ | 4.2 | | 3.8 | | 4.9 | | 4.6 | | 4.4 | |

TABLE 10

| Glass Name | Example 48 | | Example 49 | |
|---|---|---|---|---|
| Composition | mol % | wt % | mol % | wt % |
| $SiO_2$ | 49.00 | 36.02 | 49.00 | 38.73 |
| ZnO | 16.00 | 15.94 | 17.50 | 18.74 |
| BaO | 13.00 | 24.40 | 12.50 | 25.22 |
| CaO | 12.50 | 8.58 | 12.50 | 9.22 |
| $Al_2O_3$ | 1.00 | 1.25 | 1.00 | 1.34 |
| MgO | 4.50 | 2.22 | 4.50 | 2.39 |
| $La_2O_3$ | | | | |
| $TiO_2$ | 2.00 | 1.96 | 2.00 | 2.10 |
| SrO | | | | |
| $CeO_2$ | | | 1.00 | 2.26 |
| $Yb_2O_3$ | 2.00 | 9.64 | | |
| Total | 100 | 100 | 100 | 100 |
| Softening point/° C. | 764 | | 735 | |
| Peak crystallization temperature/° C. | 976 | | 950 | |
| Coefficient of thermal expansion (50-850° C.) | 123 | | 95 | |
| Flow diameter | 17.8 | | 17.6 | |
| Mean particle size $D_{50}$ | 3.8 | | 4.3 | |

INDUSTRIAL APPLICABILITY

The glass composition of the present invention can be utilized, by firing it at 850-1050° C. in contact with metal and ceramics, as a boron-free sealant for providing a seal between metal and ceramics, which is usable in an environment where it is exposed to 700-1000° C., such as in solid oxide fuel cells (SOFC) and the like.

The invention claimed is:
1. A sealing glass composition substantially free of boron oxide and comprising the following components, in mol %,

| | |
|---|---|
| SiO$_2$ | 40-50% |
| ZnO | 13 to less than 20% |
| BaO | 5-25% |
| CaO | 0-25% |
| Al$_2$O$_3$ | 0-5%, |
| MgO | 0 to less than 5%, and |
| RO | not less than 44% |

(wherein R denotes one or more species of Mg, Ca, Sr, Ba, and Zn).

2. The sealing glass composition according to claim 1 substantially free of boron oxide and comprising the following components, in mol %,

| | |
|---|---|
| SiO$_2$ | 45-50% |
| ZnO | 13 to less than 20% |
| BaO | 8-20% |
| CaO | 5-22% |
| Al$_2$O$_3$ | 0-3%, |
| MgO | 0 to less than 5%, and |
| RO | not less than 44% |

(wherein R denotes one or more species of Mg, Ca, Sr, Ba, and Zn).

3. The sealing glass composition according to claim 2 substantially free of boron oxide and comprising the following components, in mol %,

| | |
|---|---|
| SiO$_2$ | 45-50% |
| ZnO | 13 to less than 20% |
| BaO | 8-16% |
| CaO | 10-22% |
| Al$_2$O$_3$ | 0-2%, |
| MgO | 0 to less than 5%, and |
| RO | not less than 44% |

(wherein R denotes one or more species of Mg, Ca, Sr, Ba, and Zn).

4. The sealing glass composition according to claim 1 further comprising, in mol %, not more than 5% SrO.

5. The sealing glass composition according to claim 1 further comprising, in mol %, not more than 4% La$_2$O$_3$.

6. The sealing glass composition according to claim 1 further comprising, in mol %, not more than 6% TiO$_2$, not more than 5% ZrO$_2$, or not more than 2% Nb$_2$O$_5$.

7. The sealing glass composition according to claim 1 further comprising, in mol %, CeO$_2$ or Yb$_2$O$_3$ at not more than 2%.

* * * * *